United States Patent [19]

Krishnamurthy

[11] Patent Number: 4,935,215

[45] Date of Patent: Jun. 19, 1990

[54] MEASUREMENT AND CONTROL OF ZEOLITE SYNTHESIS

[75] Inventor: Sowmi Krishnamurthy, New York, N.Y.

[73] Assignee: Mobil Oil Corporation, New York, N.Y.

[21] Appl. No.: 366,111

[22] Filed: Jun. 14, 1989

Related U.S. Application Data

[63] Continuation-in-part of Ser. No. 262,201, Oct. 19, 1988, Pat. No. 4,849,194, Continuation of Ser. No. 53,905, May 26, 1987, abandoned.

[51] Int. Cl.$^5$ .............................................. C01B 33/26
[52] U.S. Cl. ................... 423/328; 23/295 R; 436/4; 502/77
[58] Field of Search ............ 423/328, 329; 502/77; 436/4; 23/295 R

[56] References Cited

U.S. PATENT DOCUMENTS

| | | | |
|---|---|---|---|
| 3,923,697 | 12/1975 | Ellis | 252/502 |
| 3,999,040 | 12/1976 | Ellis | 106/296 |
| 4,025,307 | 5/1977 | Randolph et al. | 436/4 |
| 4,038,050 | 7/1977 | Lowther | 55/18 |
| 4,046,509 | 9/1977 | Backerud | 436/4 |
| 4,053,864 | 10/1977 | Rodriguez | 252/512 |
| 4,064,074 | 12/1977 | Ellis | 252/502 |
| 4,173,622 | 11/1979 | Robertson | 423/329 |
| 4,557,858 | 12/1985 | Galloway | 423/332 |
| 4,849,194 | 7/1989 | Krishnamurthy et al. | 502/77 |
| 4,851,605 | 7/1989 | Bortinger et al. | 423/328 |

OTHER PUBLICATIONS

Chem. Abs. 75 (16): 100779c.
Chem. Abs. 109(10): 84467n.

Primary Examiner—Anthony McFarlane
Attorney, Agent, or Firm—Alexander J. McKillop; Charles J. Speciale; Malcolm D. Keen

[57] ABSTRACT

A capacitance probe is used to monitor changes in the specific electrical conductivity of the synthesis mixture used to form a solid, crystalline silicate product, especially an aluminosilicate zeolite. The technique may be used to monitor the progress of zeolite crystallization without sampling the crystallization mixture and is useful in continuous crystallization operations.

9 Claims, 1 Drawing Sheet

MEASUREMENT AND CONTROL OF ZEOLITE SYNTHESIS

CROSS-REFERENCE TO RELATED APPLICATION

This application is a continuation-in-part of prior U.S. Application Ser. No. 07/262,201, filed 19 Oct. 1988 (now U.S. Pat. No. 4,849,194) which describes a method for the measurement and control of zeolite synthesis. Ser. No. 07/262,201 is a continuation of Ser. No. 07/053,905, filed 26 May 1987, now abandoned.

FIELD OF THE INVENTION

This invention relates to a method for controlling the synthesis of zeolites and other related synthetic products which are produced from an aqueous synthesis mixture. It is particularly suitable for the control of synthesis of aluminosilicate zeolites but may also be used with other metallosilicates such as ferrosilicates, gallosilicates, germanosilicates and borosilicates as well as with other synthetically related materials.

BACKGROUND OF THE INVENTION

Ser. No. 07/262,201 discloses a method of monitoring the progress of crystallization of a crystalline silicate product e.g. a metallosilicate zeolite, by measuring the specific electrical conductivity of the synthesis mixture. The method was based upon the finding that different silicates exhibited changes in the specific conductivity of the synthesis mixture during the course of crystallization and that, although the character of the changes varied from one material to another, the changes with a single material were peculiar to that material and therefore permitted a correlation to be established between the measured conductivity and the degree of crystallization achieved. Once established, the correlation between conductivity and crystallinity enabled the progress of crystallization to be monitored either in a batch or a continuous crystallizer. The monitored values of conductivity permitted, moreover, the crystallization conditions to be controlled so as to achieve the desired degree of crystallinity. This method of control was of particular utility with continuous crystallization operations because it enabled product of consistent crystallinity to be obtained. The method was simple, rapid and permitted equipment of a robust, reliable character to be used in commercial size equipment.

Reference is made to Ser. No. 07/262,201 for a full description of the method and its use in the production of crystalline silicate products.

SUMMARY OF THE INVENTION

It has now been found that the changes in the conductance of the synthesis mixture of a crystalline silicate may be measured by the use of a capacitance probe. The capacitance probe utilizes the synthesis mixture as a component of the dielectric of a capacitor; changes in the conductivity of the synthesis mixture at constant volume result in changes in its dielectric constant which, in turn, affect the capacitance of the circuit which can then be detected by a suitable capacitance probe in conjunction with its associated circuitry. The use of the capacitance probe therefore provides a useful technique for the measurement and control of the progress of the crystallization. Capacitance probes are reliable and robust and can be readily adapted to the requirements of commercial synthesizers both of the batch and continuous types.

The probe may be self-contained or, alternatively, may be integrated with the crystallizer by using an electrically conductive wall in the synthesis vessel as one of the plates of the capacitor.

THE DRAWINGS

In the accompanying drawings:

FIG. 1 is a simplified schematic showing how the measurement of capacitance may be used to control a continuous zeolite synthesis process, and FIG. 2 is a graph showing how the capacitance of a zeolite synthesis mixture varies during the course of crystallization.

DETAILED DESCRIPTION

Figure 1:
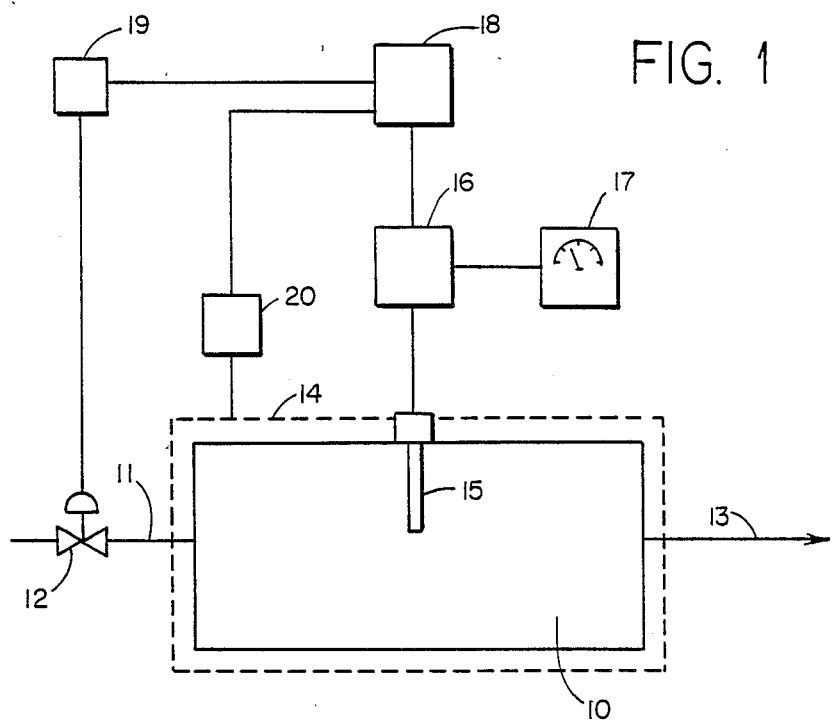

The present invention is applicable to the synthesis of crystalline silicate solids from synthesis mixtures of the kinds described in Ser. No. 07/262,201, to which reference is made for a comprehensive and detailed description of them. Thus, in particular, it is applicable to the synthesis of metallosilicate zeolites, especially aluminosilicate zeolites. Typical zeolites which may be produced in this way include mordenite, zeolite Y, ZSM-4, ZSM-12, ZSM-18, ZSM-20, zeolite beta, the intermediate pore size zeolites such as ZSM-5, ZSM-11, ZSM-22, ZSM-23, ZSM-35, ZSM-38 and small pore zeolites such as zeolite A.

As noted in Ser. No. 07/262,201, the electrical conductivity of the synthesis mixture varies during the progress of the crystallization in a manner which is predictable for any given synthesis system. Although the changes in conductivity may not be linear in relation to crystallinity, the conductivity of the mixture may be correlated with the degree of crystallinity achieved in the solid product. Correspondingly, the changes in the specific conductivity of the synthesis mixture alter it dielectric constant. The changes in dielectric constant may be exploited practically to provide an indication of the progress of the crystallization by measuring the changes in capacitance of the circuit.

Capacitance probes are commercially available. In one form they comprise a conductive probe element, typically of elongated cylindrical configuration i.e a rod, which is mounted in a housing which can be fixed in place on the walls of the vessel. The probe element and the electrically conductive walls of the vessel together consititute a capacitor with the material in the vessel-in the present case, the synthesis mixture-forming the dielectric. The two sides of the capacitor are connected to associated electrical circuitry of a conventional type which measures the capacitance of the capacitor formed by the probe, the vessel wall and the dielectric between them. Alternative types of capacitance detector may, of course, be used, for example, a capacitance cell with two parallel plates insulated from one another and with inlet and outlet ports for the synthesis mixture to enter the cell so that the composition of the mixture in the cell is representative of the mixture in the crystallizer vessel as a whole. The synthesis mixture is conventionally of sufficient dilution and composition under the sensing conditions employed to prevent any coating of the probe by any species which might become deposited onto the probe and give rise to spurious readings; in addition, the electronic circuitry associated with the probe is normally arranged to compensate for such changes.

Circuits for determining capacitance are well known and available from established suppliers. Capacitance probes are similarly available from commercial sources. A probe which has been successfully employed for the measurement of the capacitance of aluminosilicate zeolite synthesis mixtures in electrically-conductive crystallizers e.g. with stainless steel walls, is available from Drexelbrook Engineering Co., Horsham, PA 19044. The Drexelbrook 508-2X-XX series level transmitters, conventionally used for the measurement of levels in liquids, slurries, comprise a sensing probe of the type described above with associate electrical circuitry which enables the capacitance between the probe and the vessel walls to be directly measured. The probe can be directly mounted in the crystallizer and the electrical output from the transmitter utilized to provide an indication of the dielectric constant of the synthesis mixture. In this application, the level of the synthesis mixture around the probe should be kept constant in order to provide an electrical output which is directly indicative of the capacitance of the probe/vessel wall combination. For similar reasons, temperature should be regulated in order to ensure directly representative readings (since the conductivity of the mixture varies with temperature, so will dielectric constant). For this reason, the method is of particular utility with continuous crystallizers which are operated at constant temperature.

A simplified schematic of a zeolite crystallizer is shown in FIG. 1. A stainless steel crystallizer 10 which may be a continuous stirred tank reactor (CSTR), a tubular reactor (plug flow reactor) or a combination of the two, receives a synthesis mixture through feed line 11 with the rate of feed controlled by valve 12. Product is withdrawn from the crystallizer through product line 13. Thermal jacket 14 is used to maintain the crystallizer at a constant temperature. Capacitance probe 15 in the crystallizer is connected to a transmitter 16 which monitors the capacitance between the probe element and the walls of the crystallizer, and hence, provides an output indicative of the specific electrical conductivity of the synthesis mixture which, in turn, is related to the degree of crystallinity of the product. Transmitter 16 is connected to provide an output to monitor 17 showing the instantaneous measured value as well as to a set point controller 18 which adjusts the feed rate by means of flow rate controller 19 and valve 12 to obtain the desired crystallinity in the product. Alternatively, the set point controller may be used to adjust the temperature of the crystallizer through temperature regulator 20 which controls the crystallizer jacket 14 if a certain production rate is required. Actually, it is possible to control both the feed rate as well as the temperature and, if other process parameters may be varied in order to bring the product crystallinity to the desired level without affecting other characteristics of the product, this also may be done. Control may be affected either manually or according to a predetermined program in automatic, process control equipment. Conventionally, appropriate control systems will detect a variation in the capacitance from predetermined value which is related to the desired crystallinity and in response to the measured deviation, will initiate an error signal proportionate to the deviation. The error signal will then initiate a proportionate corrective action, e.g. temperature change, flow rate change or both, to reduce the error signal to zero and restore the operating parameters to desired limits.

The present technique therefore provides an indirect measurement of the specific electrical conductivity of the synthesis mixture, using a simple robust measuring device which is readily adaptable to the service requirements of zeolite synthesis.

EXAMPLE

Zeolite ZSM-5 was prepared and the progress of the crystallization monitored as described below.

A capacitance probe connected to a transmitter capable of generating a 4–20 mA DC current and a DC ammeter and recorder was inserted into a stainless steel 5 gallon autoclave filled with the following mix:

| | |
|---|---|
| $SiO_2$, g. | 4275 |
| $Al_2(SO_4)_3 xH_2O$, g. | 430 |
| 50% NaOH, g. | 1155 |
| NaCl, g. | 190 |
| $H_2O$, g. | 7387 |
| Daxad, g. | 35 |
| TPABr, g. | 3840 |

Figure 2:
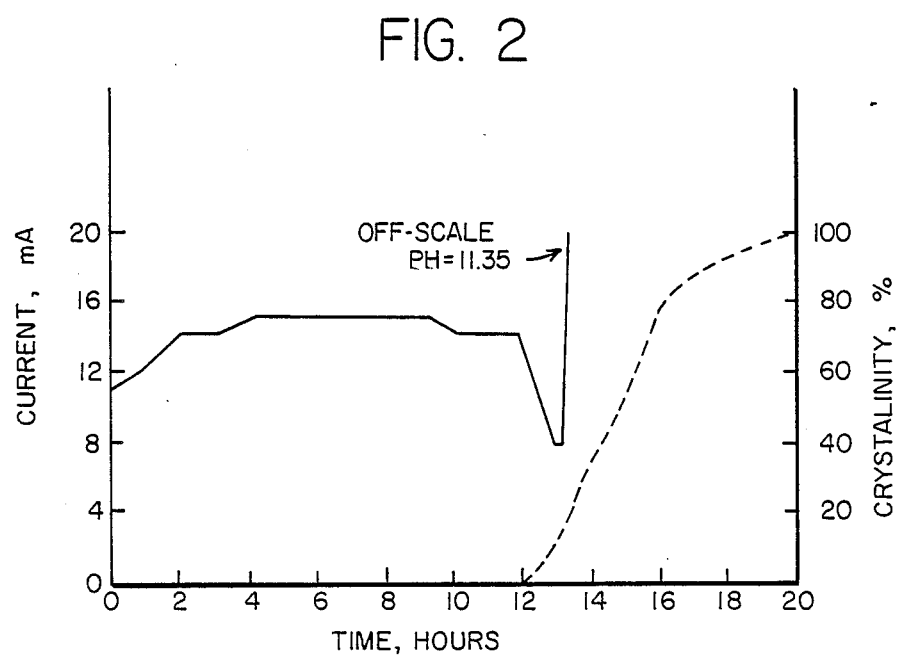

The mixture was heated up to temperature (260° F.) with agitation and the probe circuit adjusted to obtain a current of 10 mA. A recording of the current reading and percentage crystallinity as a function of synthesis time is shown in FIG. 2 below. The corresponding values of crystallinity of the synthesis mixture are given in Table 1 below. It may be seen from this Figure that the onset of crystallization is marked by an abrupt increase in the current generated in the probe circuit. After reaching an upper limit the value of the current levels off indicating complete crystallization. Supporting evidence is provided in Table 1 wherein a crystallinity of 100% ZSM-5 is obtained at the end of 20 hours.

TABLE 1

| Time, hrs. | pH | % Crystallinity |
|---|---|---|
| 0 | 10.71 | Amorphous |
| 2 | 10.72 | Amorphous |
| 6 | 10.76 | Amorphous |
| 10 | 10.8 | Trace ZSM-5 |
| 12 | 10.84 | 10% ZSM-5 |
| 14 | 10.82 | 10% ZSM-5 |
| 16 | 10.82 | 80% ZSM-5 |
| 20 | 11.2 | 100% ZSM-5 |

I claim:
1. A method of synthesizing a solid crystalline silicate product from a crystallization mixture including a source of silica which comprises:
  establishing a relationship between the dielectric constant of the crystallization mixture and the crystallinity of the solid product,
  crystallizing the crystalline silicate product from the crystallization mixture,
  measuring the dielectric constant of the crystallization mixture;
  continuing to crystallize the mixture until the dielectric constant achieves a value which, from the relationship established between the dielectric constant and the crystallinity of the solid product, is indicative of a selected crystallinity; and
  terminating crystallization when the selected crystallinity has been achieved.
2. A process according to claim 1 in which the crystallization mixture comprises water, a source of silica and a source of alumina and the silicate product comprises an aluminosilicate.

3. A process according to claim 2 in which the aluminosilicate is ZSM-5.

4. A method of monitoring the synthesis of a crystalline silicate product from a synthesis mixture comprising a source of silica, which method comprises (i) establishing a relationship between the crystallinity of the crystalline silicate product and the dielectric constant of the synthesis mixture from which the product is crystallized, (ii) forming the crystalline silicate produced from the synthesis mixture, (iii) measuring the dielectric constant of the synthesis mixture and (iv) correlating the measured value of the dielectric constant with the crystallinity of the product from the relationship established between the crystallinity of the silicate product and the dielectric constant of the mixture.

5. A method according to claim 4 in which the synthesis mixture is an aqueous synthesis mixture comprising a source of silica and a source of alumina and the silicate product comprises an aluminosilicate.

6. A method according to claim 5 in which the aluminosilicate is zeolite ZSM-5.

7. A method of determining the crystallinity of a solid, crystalline aluminosilicate product during the course of its synthesis from an aqueous synthesis mixture comprising a source of silica and a source of alumina, which method comprises (i) establishing a relationship between the capacitance of a sample of the synthesis mixture when interposed between the plates of an electrical capacitor and the crystallinity of the aluminosilicate product crystallizing from the synthesis mixture, (ii) crystallizing the product from the synthesis mixture, (iii) measuring the capacitance of a capacitor including the synthesis mixture as a dielectric fluid (iv) correlating the measured capacitance with the established relationship with product crystallinity so as to determine a selected crystallinity of the product.

8. In a continuous zeolite crystallization method in which a crystalline zeolite product is synthesized from a synthesis mixture including a source of silica, which mixture is passed through a continuous flow crystallization reactor to form a reactor effluent and the crystalline zeolite recovered from the reactor effluent, the method comprising the steps of (i) establishing a relationship between the crystallinity of the zeolite product and the specific electrical conductivity of the synthesis mixture, (ii) measuring the specific electrical conductivity of the reactor effluent, (iii) controlling the conditions of the crystallization in response to the measured specific conductivity indicative of the crystallinity of the zeolite product according to the relationship established between the crystallinity of the zeolite product and the specific electrical conductivity of the synthesis mixture, the improvement comprising measuring the specific electrical conductivity of the synthesis mixture indirectly by measuring the dielectric constant of the synthesis mixture.

9. A method according to claim 8 in which the capacitance of a capacitor including the synthesis mixture as a dielectric is measured.

* * * * *